(12) United States Patent
Nielsen

(10) Patent No.: US 10,060,521 B2
(45) Date of Patent: Aug. 28, 2018

(54) LUBRICATION ARRANGEMENT FOR A UNIT IN A VEHICLE

(71) Applicant: BorgWarner TorqTransfer Systems AB, Landskrona (SE)

(72) Inventor: Berne Nielsen, Vellinge (SE)

(73) Assignee: BorgWarner TorqTransfer Systems AB, Landskrona (SE)

( * ) Notice: Subject to any disclaimer, the term of this patent is extended or adjusted under 35 U.S.C. 154(b) by 75 days.

(21) Appl. No.: 15/103,650

(22) PCT Filed: Feb. 6, 2014

(86) PCT No.: PCT/SE2014/050152
§ 371 (c)(1),
(2) Date: Jun. 10, 2016

(87) PCT Pub. No.: WO2015/088415
PCT Pub. Date: Jun. 18, 2015

(65) Prior Publication Data
US 2016/0312880 A1    Oct. 27, 2016

(30) Foreign Application Priority Data
Dec. 12, 2013   (SE) ...................................... 1351486

(51) Int. Cl.
*F16H 57/04* (2010.01)
(52) U.S. Cl.
CPC ....... *F16H 57/0493* (2013.01); *F16H 57/045* (2013.01); *F16H 57/0424* (2013.01); *F16H 57/0471* (2013.01); *F16H 57/0473* (2013.01)

(58) Field of Classification Search
CPC combination set(s) only.
See application file for complete search history.

(56) References Cited

U.S. PATENT DOCUMENTS 1,176,936 A  *  3/1916  Waldon ............... F16H 57/0434
                                                184/13.1
2,840,186 A  *  6/1958  Arthur ................ F16H 57/0421
                                                184/6.12

(Continued)

FOREIGN PATENT DOCUMENTS

CN      2441677 Y    8/2001
CN      1663837 A    9/2005

(Continued)

OTHER PUBLICATIONS

Japanese Office Action dated Dec. 15, 2017 ; Application No. 2016-538590; Applicant: Fujita, Kazuko; 5 pages.

(Continued)

*Primary Examiner* — Michael A Riegelman
(74) *Attorney, Agent, or Firm* — BrooksGroup

(57) ABSTRACT

A lubrication arrangement for a bevel gear unit, such as a final drive (10-19) or a power takeoff unit (PTU), in the drive line of a vehicle has an external oil reservoir (25) on the unit to be lubricated. From this reservoir oil channels (27, 28) in the housing (11) of the unit lead to areas in the unit in special need of oil supply, such as to pinion bearings (16, 17) and to the area of gear engagement between pinion (10) and crown wheel (12). There is also a return channel (30) in the housing (11) of the unit for returning oil thrown out by the crown wheel (12) against the inside of the housing to the reservoir (25).

4 Claims, 2 Drawing Sheets

(56) References Cited

U.S. PATENT DOCUMENTS

| | | | | |
|---|---|---|---|---|
| 3,182,527 | A * | 5/1965 | Bryan | F16H 57/0483 |
| | | | | 184/1.5 |
| 3,788,426 | A * | 1/1974 | Hull, Jr. | F16H 57/0406 |
| | | | | 184/109 |
| 8,657,073 | B2 * | 2/2014 | Matsumoto | F16H 57/0483 |
| | | | | 184/11.1 |
| 8,899,381 | B2 * | 12/2014 | Ebihara | B60K 7/0007 |
| | | | | 184/6.12 |
| 9,410,610 | B1 * | 8/2016 | Pritchard | F16H 57/045 |
| 9,746,069 | B2 * | 8/2017 | Gerstenberger | F16H 57/037 |
| 9,772,027 | B2 * | 9/2017 | Preston | F16H 57/0423 |
| 2004/0159520 | A1 | 8/2004 | Anwar et al. | |
| 2010/0140019 | A1 * | 6/2010 | Imai | F16H 57/0493 |
| | | | | 184/6.12 |
| 2010/0144480 | A1 * | 6/2010 | Downs | F16H 57/0457 |
| | | | | 475/160 |
| 2012/0031727 | A1 * | 2/2012 | Nett | F16H 57/0409 |
| | | | | 192/113.1 |
| 2012/0073403 | A1 | 3/2012 | Perakes et al. | |

FOREIGN PATENT DOCUMENTS

| | | |
|---|---|---|
| JP | H04127452 U | 11/1992 |
| JP | H10291427 A | 11/1998 |
| JP | 2008279826 A | 11/2008 |
| JP | 2009174682 A | 8/2009 |
| JP | 4891890 B2 | 3/2012 |
| WO | 2015088415 A1 | 6/2015 |

OTHER PUBLICATIONS

Chinese Office Action dated Feb. 24, 2018; Application No. 2014800678501; Applicant: BorgWarner TorqTransfer Systems AB; 8 pages.

* cited by examiner

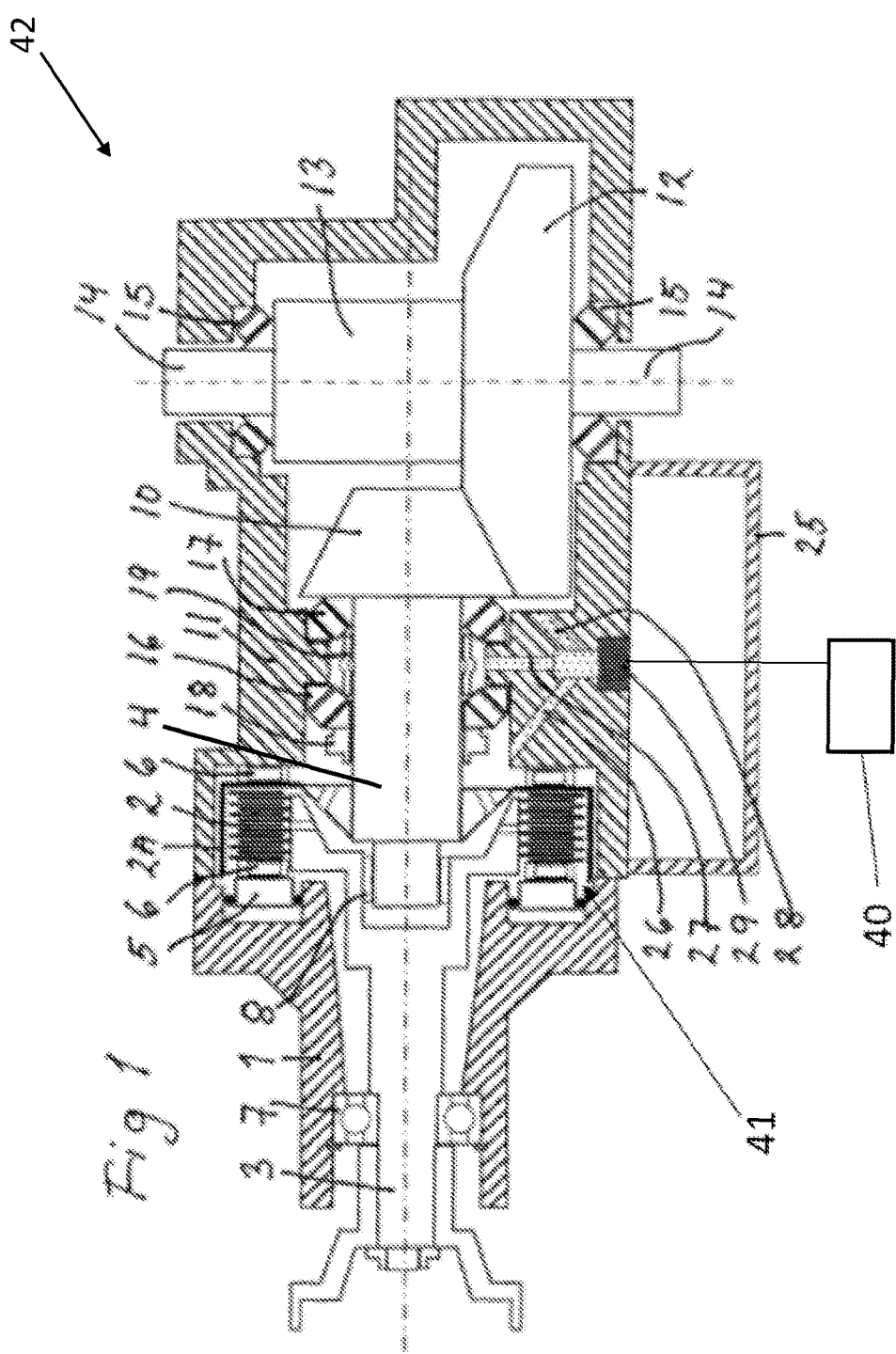

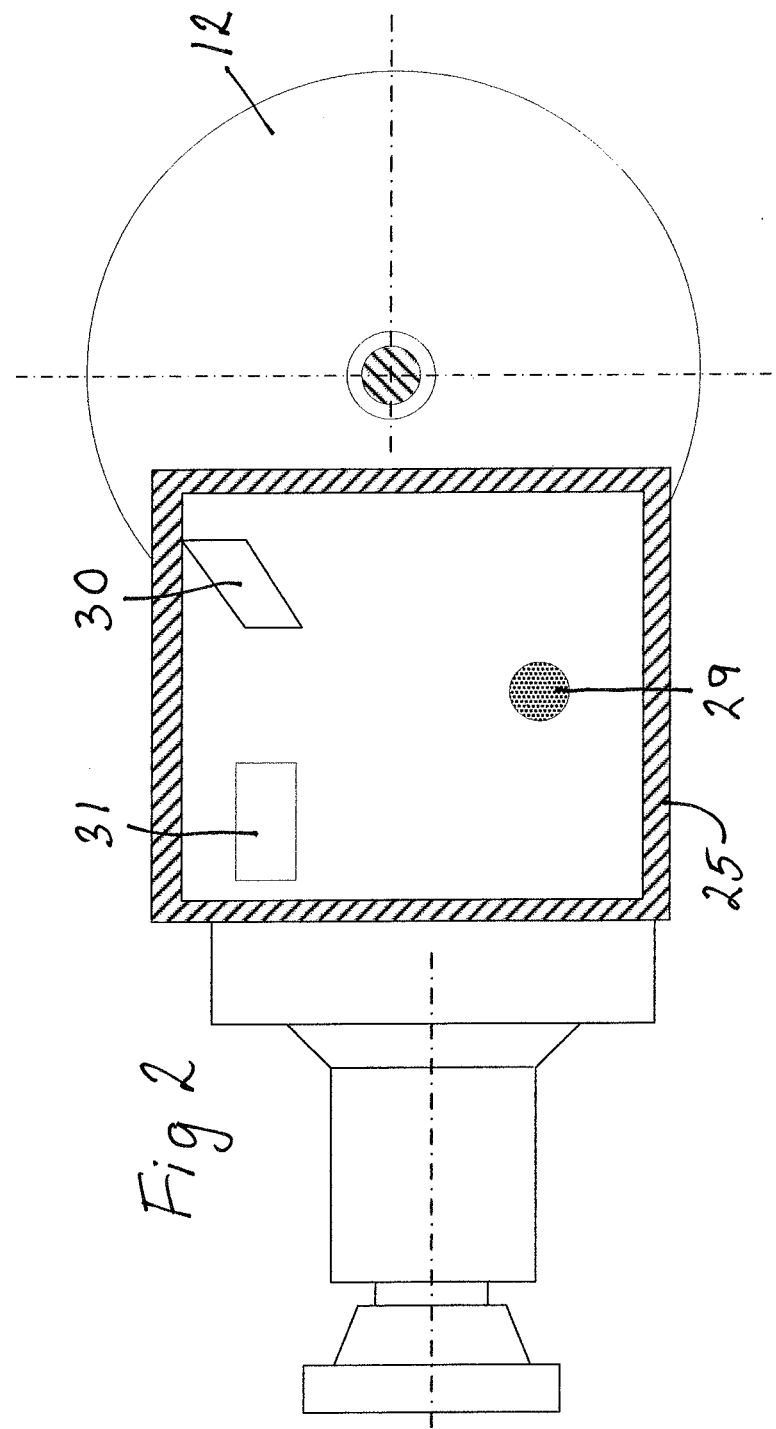

LUBRICATION ARRANGEMENT FOR A UNIT IN A VEHICLE

This application claims the benefit of Swedish Application No. 1351486-4 filed. Dec. 12, 2013 and PCT Application. No. SE2014/050152 filed Feb. 6, 2014.

TECHNICAL FIELD

The present invention relates to a lubrication arrangement for a bevel gear unit, such as a final drive or a power takeoff unit (PTU), in the driveline of a vehicle.

BACKGROUND OF THE INVENTION

Bevel gear units are used in vehicles for changing the torque transmission direction in their drivelines.

Especially, in an all wheel drive vehicle (AWD) it is customary that the front wheels are always driving, whereas the rear wheels are driving only when a limited slip coupling transmits torque thereto under the control of vehicle electronics. The limited slip coupling or AWD coupling is normally attached to a final drive, which transmits torque from a longitudinal propeller shaft, through the AWD coupling, and to the rear wheels. The final drive usually contains a differential.

In conjunction with the motor/gearbox unit and the front wheel axles there is also a bevel gear unit or power takeoff unit (PTU) for transmitting torque to the forward end of the propeller shaft.

The final drive and the power takeoff unit—with its pinion and crown wheel in gear engagement—are normally filled with oil to a certain level. The rotation of the crown wheel is used to throw oil to especially the pinion bearings through channels in the respective housing.

Although the AWD coupling is often attached to the final drive, these two units—usually coming from different suppliers—have separate lubrication systems and are sealed against oil leakage between each other.

For lubrication, the AWD coupling may be filled with oil to a certain level, so that the coupling disc package within the coupling housing rotates in the oil, and bearings, seals, and discs thereby are lubricated and cooled by oil splash and mist.

The rotation in oil bath of the participating parts causes considerable energy losses. The lubricating flow depends to a great extent on the rotational speed and has to be adapted to the worst operational case (high torque). Especially when only the front wheels drive and the rear wheels idle, the transmitted torque is neglectable, which means that the lubricating flow is grossly overdimensioned.

THE INVENTION

Disadvantages with existing arrangements may be removed by the use of an arrangement according to the invention, which is characterized by an external oil reservoir on the unit to be lubricated, from which oil channels in the housing of the unit lead to areas in the unit in special need of oil supply, such as to pinion bearings and to the area of gear engagement between pinion and crown wheel, and by a return channel in the housing of the unit for returning oil thrown out by the crown wheel against the inside of the housing to the reservoir.

By this arrangement the oil flow can be directed in a better way and in a suitable quantity to the areas in the bevel gear unit where it is primarily needed. The energy losses in the bevel gear units will decrease, as rotating parts will rotate primarily in air instead of in oil bath.

Further energy savings can be obtained, if a control valve is arranged in the inlet to the oil channels in the external oil reservoir for controlling the supply of oil in dependence of the actual torque transmission of the unit.

The control valve is preferably electrically or hydraulically controlled.

In a practical case a final drive can be combined with an AWD coupling into a unit. In such a case there can be a further oil channel, connected to the other oil channels and leading to the disc package of the AWD coupling, as well as a return channel to the common external oil reservoir.

By such a common lubrication system costs are reduced, for example because the radial internal sealings are no longer needed. Energy losses are likewise reduced not only in the coupling itself but also due to the omission of the internal sealings.

BRIEF DESCRIPTION OF THE DRAWINGS

The invention will be described in further detail below under reference to the accompanying drawings, in which FIG. 1 is a longitudinal schematical section from above through a final drive and an AWD coupling attached thereto with a lubrication arrangement according to the invention and FIG. 2 is a very schematical side view of the combination shown in FIG. 1 with an oil reservoir thereof shown in section.

DETAILED DESCRIPTION

A combination of a final drive 42 and an AWD coupling 41 in a road vehicle—a car—is shown in FIG. 1. The description below is focused on parts that are of importance for the proper understanding of the invention, as both the final drive 42 and the AWD coupling 41 are per se known and understood by persons skilled in the art.

In a coupling housing 1 a disc package 2 comprising a number of discs is arranged. These discs are alternatingly connected on one hand to a rotatably journaled ingoing axle 3 and on the other hand to a rotatably journaled outgoing axle 4 in the form of a pinion axle of the final drive (to be described). The connection to the outgoing axle 4 is performed via a disc drum 2A. The disc drum 2A is in splines engagement with the axle 4 and thus axially movable in relation thereto.

The disc package 2 is controlled by hydraulic pressure applied on a hydraulic piston 5 in the housing 1. The magnitude of the force from the hydraulic piston 5 will control the clamping force on and thus the torque transmitted by the disc package 2 from the ingoing axle 3 to the outgoing axle 4. The force from the piston 5 is transmitted to the disc package 2 and back into the housing 1 by means of axial bearings 6, preferably needle bearings.

The ingoing axle 3 is journaled in the housing 1 by means of only a radial bearing 7, but the pinion axle 3 extends in a supporting fashion into the opposite end, where there is a radial bearing 8, preferably a needle bearing.

A pinion 10 (integral with the pinion axle 4) is rotatably journaled in a final drive housing 11, which is connected to the coupling housing 1. The final drive comprises the pinion 10 and a crown wheel 12 to form a bevel gear set, normally a hypoid gear set. A differential housing 13 is connected to the crown wheel 12 and contains a conventional differential mechanism, from which two half-axles 14 extend out to driving wheels of the vehicle. The arrangement may be journaled in the final drive housing 11 by combined axial and radial bearings 15.

Shown in FIG. 1 is a conventional journaling for a pinion in a hypoid gear set of a final drive. This journaling comprises two bearings 16 and 17, normally conical roller bearings or angular contact ball bearings. Axial prestress on the journaling is provided by a nut 18. There is a plate sleeve 19 between the inner rings of the two bearings 16, 17.

Shown in FIG. 1 and also in FIG. 2 (to which now reference is additionally made) is an external oil reservoir 25, which in the shown example is common for the AWD coupling 41 and the final drive 42.

From this reservoir 25 oil channels 26-28 lead to areas in the arrangement in special need of oil supply, for example practically continuous oil supply, namely in this case the first channel 26 to the disc package 2, the second channel 27 to the pinion bearings 16 and 17, and the third channel 28 to the gear engagement area between the pinion 10 and the crown wheel 12.

Other parts and areas of the arrangement are lubricated by oil splashes and oil mist.

In the common inlet to these channels 26-28 placed in the lower part of the oil reservoir there may be provided a control valve 29. If this valve is open, there will be an unaffected oil flow by gravity. This is the position for full torque transmission by the arrangement. At a lower torque transmission—for example when the vehicle is driven only or mainly by the front wheels—the control valve 29 is shut or open to a limited extent.

The operation of the control valve 29 may be governed by a control unit 40 in the vehicle. The actuation of the valve may be electrical, for example by a solenoid, or hydraulical.

By the rotation of the crown wheel 12 in the final drive 42 and of the disc package 2 in the AWD coupling 41, oil is thrown out against the inside of the respective housing and may be brought back to the oil reservoir 25 through a return channel 30 and 31, respectively. The return channels 30 and 31 are arranged at a higher level in the reservoir 25 than the inlet to the channels 26-28. This inlet is placed at such a height that oil is supplied to the desired areas by gravity. The oil volume in the arrangement is preferably such that oil is only supplied after the return of oil through the return channels 30 and 31.

Modifications are possible within the scope of the appended claims.

The invention claimed is:

1. A lubrication arrangement for a final drive operatively connected to an AWD coupling and having a bevel gear unit, comprising: an external oil reservoir secured to and in operative communication with the bevel gear unit; a first and second oil channel defined within a housing surrounding at least a portion of a pinion and a crown wheel, wherein the first and the second oil channel extend from the external oil reservoir to areas within the bevel gear unit in need of an oil supply; a first return channel defined within the housing extending to the external oil reservoir, wherein the first return channel is constructed and arranged to return oil thrown by the crown wheel toward an inside surface of the housing to the external oil reservoir; and a third oil channel defined within the housing, connected to the first and the second oil channels and leading to a disc package of the AWD coupling, and to a second return channel defined within the housing extending to the external oil reservoir.

2. The lubrication arrangement according to claim 1, wherein a control valve is arranged within an inlet to the first and the second oil channels in the external oil reservoir for controlling the oil supply based on an actual torque transmission of the bevel gear unit.

3. The lubrication arrangement according to claim 2, wherein the control valve is electrically or hydraulically controlled.

4. The lubrication arrangement as set forth in claim 1, wherein the areas in the bevel gear unit in need of the oil supply comprise pinion bearings and an area of gear engagement between the pinion and the crown wheel.

* * * * *